United States Patent
Miyoshi et al.

(10) Patent No.: US 11,076,070 B2
(45) Date of Patent: Jul. 27, 2021

(54) INFORMATION PROCESSING APPARATUS AND NON-TRANSITORY COMPUTER READABLE MEDIUM INFORMATION PROCESSING APPARATUS AND NON-TRANSITORY COMPUTER READABLE MEDIUM FOR PROVIDING INFORMATION REGARDING AVAILABILITY OF A FUNCTION PERFORMED BY A DEVICE UPON DISCONNECTION OF THE DEVICE FROM THE INFORMATION PROCESSING APPARATUS

(71) Applicant: FUJIFILM BUSINESS INNOVATION CORP., Tokyo (JP)

(72) Inventors: Nobukazu Miyoshi, Kanagawa (JP); Shunji Tsunashima, Kanagawa (JP); Terutake Hayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/837,397

(22) Filed: Apr. 1, 2020

(65) Prior Publication Data
US 2021/0099607 A1    Apr. 1, 2021

(30) Foreign Application Priority Data

Sep. 30, 2019   (JP) .............................. JP2019-180325

(51) Int. Cl.
*H04N 1/00*    (2006.01)
*H04N 1/32*    (2006.01)
(Continued)

(52) U.S. Cl.
CPC ..... *H04N 1/32577* (2013.01); *H04N 1/00416* (2013.01); *H04N 1/00474* (2013.01); *H04N 1/32101* (2013.01)

(58) Field of Classification Search
None
See application file for complete search history.

(56) References Cited

U.S. PATENT DOCUMENTS

2006/0238786 A1* 10/2006 Sakura .................. G06F 3/1285
358/1.9
2009/0225349 A1* 9/2009 Hirai ..................... G06F 3/1229
358/1.15
(Continued)

FOREIGN PATENT DOCUMENTS

JP    2009157986    *    7/2009    ............. G11B 20/10
JP    2012-037928 A        2/2012

*Primary Examiner* — Beniyam Menberu
(74) *Attorney, Agent, or Firm* — Oliff PLC

(57) ABSTRACT

An information processing apparatus includes a memory and a processor. The processor is configured to: when an extension device that extends functions of the information processing apparatus by being connected to the information processing apparatus is connected to the information processing apparatus, display (i) information representing a basic function provided in the information processing apparatus and (ii) information representing an extended function added by the extension device on one screen together; and when the connection with the extension device is released, display the information representing the extended function so as to indicate that the extended function becomes available when the extension device is connected to the information processing apparatus.

8 Claims, 17 Drawing Sheets

(51) Int. Cl.
*G06F 3/12* (2006.01)
*G06K 15/02* (2006.01)

(56) References Cited

U.S. PATENT DOCUMENTS

| | | | |
|---|---|---|---|
| 2012/0033257 A1 | 2/2012 | Okazawa | |
| 2014/0075003 A1* | 3/2014 | Tanaka | H04L 41/085 709/223 |
| 2014/0139878 A1* | 5/2014 | Kadota | G06K 15/183 358/1.15 |
| 2015/0347066 A1* | 12/2015 | Moritomo | H04N 1/00251 358/1.15 |
| 2018/0109691 A1* | 4/2018 | Tokuchi | H04N 1/00129 |
| 2018/0213114 A1* | 7/2018 | Utsumi | H04N 1/32776 |

* cited by examiner

FIG.3

BASIC FUNCTION INFORMATION 31

| FUNCTION ITEM 1 | FUNCTION ITEM 2 | PROCESSING LOCATION |
|---|---|---|
| PRINT | ⋯⋯ | ⋯⋯ |
| SCAN | NORMAL MODE<br>HIGH COMPRESSION MODE | IMAGE FORMING APPARATUS<br>IMAGE FORMING APPARATUS |
| COPY | ⋯⋯ | ⋯⋯ |
| ⋯⋯ | ⋯⋯ | ⋯⋯ |

FIG.7

EXTENDED FUNCTION INFORMATION 61

| FUNCTION ITEM 1 | FUNCTION ITEM 2 | PROCESSING LOCATION |
|---|---|---|
| SCAN | HIGH COMPRESSION MODE | EXTERNAL CPU DEVICE |
|  | HIGH COMPRESSION PDF | EXTERNAL CPU DEVICE |

BASIC FUNCTION INFORMATION 31

| FUNCTION ITEM 1 | FUNCTION ITEM 2 | PROCESSING LOCATION |
|---|---|---|
| PRINT | ...... | ...... |
| SCAN | NORMAL MODE | IMAGE FORMING APPARATUS |
|  | HIGH COMPRESSION MODE | IMAGE FORMING APPARATUS |
| COPY | ...... | ...... |
| ...... | ...... | ...... |

GENERATED BY COMBINED FUNCTION INFORMATION GENERATOR 52

COMBINED FUNCTION INFORMATION 62

| FUNCTION ITEM 1 | FUNCTION ITEM 2 | PROCESSING LOCATION |
|---|---|---|
| PRINT | ...... | ...... |
| SCAN | NORMAL MODE | IMAGE FORMING APPARATUS |
|  | HIGH COMPRESSION MODE | EXTERNAL CPU DEVICE |
|  | HIGH COMPRESSION PDF | EXTERNAL CPU DEVICE |
| COPY | ...... | ...... |
| ...... | ...... | ...... |

EXAMPLE OF TRANSITION OF DISPLAY SCREEN WHEN IMAGE FORMING APPARATUS 10 OF PRESENT EXEMPLARY EMBODIMENT IS NOT USED

EXTERNAL CPU DEVICE MOUNTED

EXTERNAL CPU DEVICE DISCONNECTED

OK IS PRESSED

FIG.11

HISTORY FUNCTION INFORMATION 33

| FUNCTION ITEM 1 | FUNCTION ITEM 2 | PROCESSING LOCATION (PRESENT) | PROCESSING LOCATION (PAST) |
|---|---|---|---|
| PRINT | ⋮⋮ | ⋮⋮ | ⋮⋮ |
| SCAN | NORMAL MODE<br>HIGH COMPRESSION MODE<br>HIGH COMPRESSION PDF | IMAGE FORMING APPARATUS<br>IMAGE FORMING APPARATUS<br>× | IMAGE FORMING APPARATUS<br>EXTERNAL CPU DEVICE<br>EXTERNAL CPU DEVICE |
| COPY | ⋮⋮ | ⋮⋮ | ⋮⋮ |
| ⋯ | ⋮⋮ | ⋮⋮ | ⋮⋮ |

BASIC FUNCTION INFORMATION 31

GENERATED BY EXTERNAL CPU DEVICE CONNECTION CONTROLLER 21

COMBINED FUNCTION INFORMATION 32

EXAMPLE OF TRANSITION OF DISPLAY SCREEN WHEN IMAGE FORMING APPARATUS 10 OF PRESENT EXEMPLARY EMBODIMENT IS USED

EXTERNAL CPU DEVICE 40 MOUNTED

EXTERNAL CPU DEVICE 40 DISCONNECTED

INFORMATION PROCESSING APPARATUS AND NON-TRANSITORY COMPUTER READABLE MEDIUM INFORMATION PROCESSING APPARATUS AND NON-TRANSITORY COMPUTER READABLE MEDIUM FOR PROVIDING INFORMATION REGARDING AVAILABILITY OF A FUNCTION PERFORMED BY A DEVICE UPON DISCONNECTION OF THE DEVICE FROM THE INFORMATION PROCESSING APPARATUS

CROSS-REFERENCE TO RELATED APPLICATIONS

This application is based on and claims priority under 35 USC 119 from Japanese Patent Application No. 2019-180325 filed Sep. 30, 2019.

BACKGROUND

1. Technical Field

The present disclosure relates to an information processing apparatus and a non-transitory computer readable medium.

2. Related Art

JP-A-2012-037928 discloses a system in which, when an information processing apparatus connectable to an image forming apparatus via a network extends the functions of the image forming apparatus, UI display/operation of the extended function is controlled by the information processing apparatus.

SUMMARY

A system has been proposed in which an extension device is connected to an information processing apparatus to add an extended function to a basic function originally provided in the information processing apparatus.

When the extension device is connected to the information processing apparatus in such a system, a display of the information processing apparatus displays a user interface (UI) that allows a user to select an extended function to be added to the basic function.

However, when the extension device is disconnected from the information processing apparatus for some reason, a display screen of the display no longer displays the UI which allows the user to select an extended function, and the user who has used the extended function may be confused in operation.

Aspects of non-limiting embodiments of the present disclosure relate to providing an information processing apparatus and a non-transitory computer readable medium allowing a user to know an extended function that has been enabled, even when an extension device for adding an extended function to an information processing apparatus is once connected to the information processing apparatus and is thereafter disconnected from the information processing apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus includes a memory and a processor configured to: when an extension device that extends functions of the information processing apparatus by being connected to the information processing apparatus is connected to the information processing apparatus, display (i) information representing a basic function provided in the information processing apparatus and (ii) information representing an extended function added by the extension device on one screen together; and when the connection with the extension device is released, display the information representing the extended function so as to indicate that the extended function becomes available when the extension device is connected to the information processing apparatus.

BRIEF DESCRIPTION OF THE DRAWINGS

Exemplary embodiment(s) of the present disclosure will be described in detail based on the following figures, wherein:

FIG. 3 is a view illustrating an example of basic function information;

FIG. 4 is a view illustrating operation performed when the image forming apparatus in the state illustrated in FIG. 2 is powered on;

FIG. 7 is a view illustrating an example of extended function information;

FIG. 11 is a view illustrating an example of history function information generated by an external CPU device connection controller;

FIG. 16 is a flowchart of the operation of the UI display control when the image forming apparatus is powered on;

DETAILED DESCRIPTION

Hereinafter, exemplary embodiments of the present disclosure will be described in detail with reference to the accompanying drawings.

Figure 1:
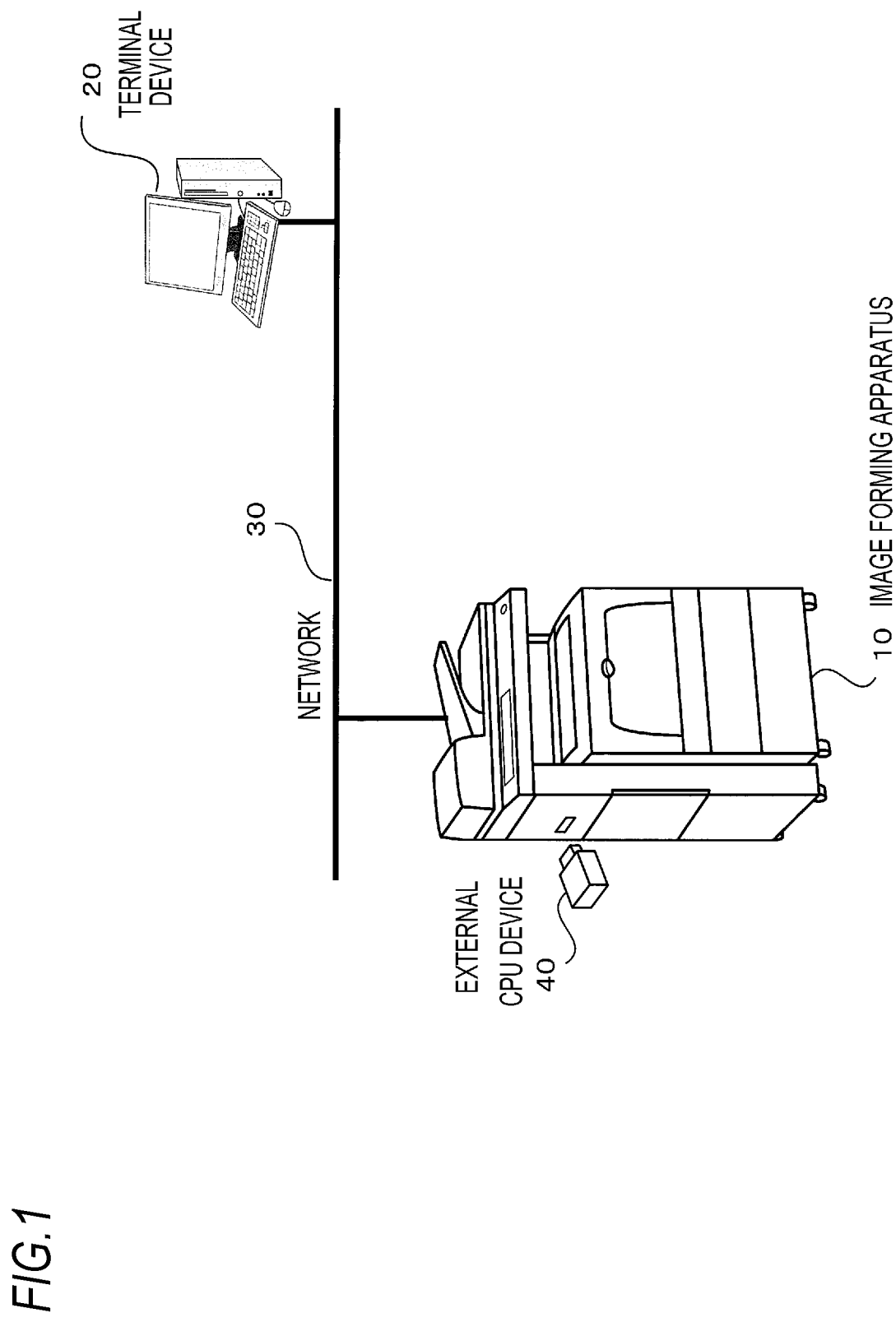
FIG. 1 is a view illustrating a system configuration of an image forming system according to an exemplary embodiment of the present disclosure.

FIG. 1 is a view illustrating a system configuration of an image forming system according to an exemplary embodiment of the present disclosure.

As illustrated in FIG. 1, an image forming system according to an exemplary embodiment of the present disclosure includes an image forming apparatus 10 and a terminal device 20 that are interconnected by a network 30, and an external CPU device 40. The terminal device 20 is a client device that generates print data and transmits the generated print data to the image forming apparatus 10 via the network 30. The image forming apparatus 10 receives the print data transmitted from the terminal device 20, and outputs an image corresponding to the print data onto a sheet. The image forming apparatus 10 is a so-called multifunction machine having multiple functions such as a print function, a scan function, a copy function, a facsimile function and so on.

The external CPU device 40 is an information processing device including a high-performance CPU and a high-capacity memory therein, such as a stick-type personal computer or a tablet terminal device. The external CPU device 40 is connectable to the image forming apparatus 10 via a hot-swappable interface such as a USB.

When the external CPU device 40 is connected to the image forming apparatus 10, the functions of the image forming apparatus 10 are extended. That is, the external CPU device 40 functions as an extension device that extends the functions of the image forming apparatus 10 by being connected to the image forming apparatus 10.

When the external CPU device 40 is connected to the image forming apparatus 10, the image forming apparatus 10 is able to execute a new function, or is able to execute an executable function with a further higher performance. A function that becomes available by the connection of the external CPU device 40 will be referred to as an "extended function".

Here, the extended functions includes functions of executing various processes such as a high compression Portable Document Formant (PDF) process, a high-precision T/I separation process (separating a text and an image with a high precision), high-quality processing for a reading process, an Optical Character Reading (OCR) process, an image enlargement/reduction process, a read data storage process, a service menu display and service selection process (for example, displaying or selecting a service menu on another device wirelessly). The high compression PDF process refers to a process of generating PDF data by compressing image data read by scanning into, for example, about one-tenth of the size of the image data.

To facilitate the understanding of descriptions, FIG. 1 represents that the external CPU device 40 is connected to the image forming apparatus 10 in a state of appearing outside the image forming apparatus 10. However, when the external CPU device 40 is connected to the image forming apparatus 10, the external CPU device 40 may be housed inside the image forming apparatus 10 in a state where the external CPU device 40 cannot be seen from the outside.

Figure 2:
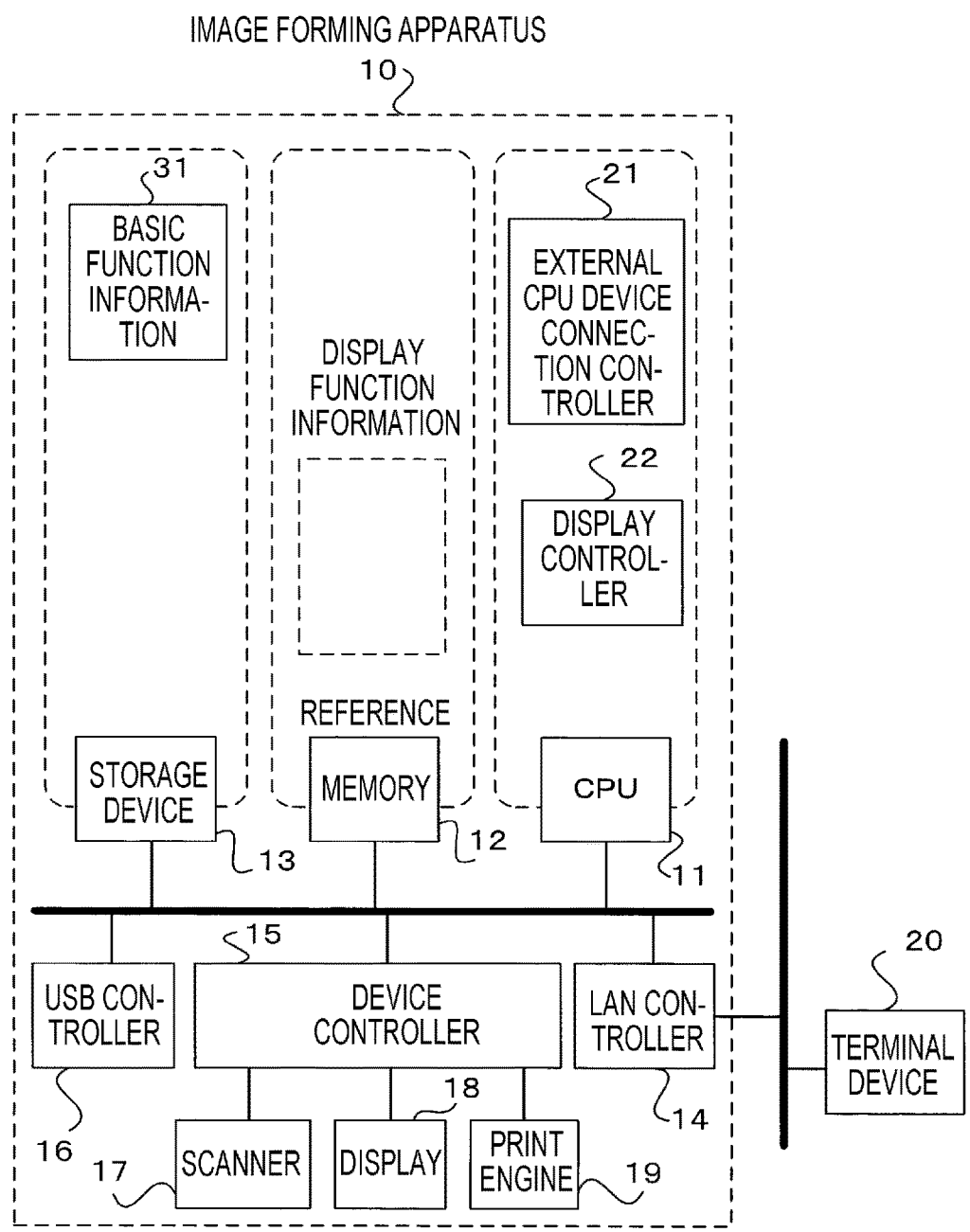
FIG. 2 is a view illustrating a hardware configuration and a functional configuration of the image forming apparatus according to the exemplary embodiment of the present disclosure.

Next, FIG. 2 illustrates a hardware configuration and a functional configuration of the image forming apparatus 10 in the image forming system of the present exemplary embodiment.

As illustrated in FIG. 2, the image forming apparatus 10 includes a CPU 11, a memory 12, a nonvolatile storage device 13 such as a hard disk drive (HDD) or a flash memory, a LAN controller 14, a device controller 15, a USB controller 16, a scanner 17, a display 18, and a print engine 19. These elements are interconnected via a control bus.

The CPU 11 controls the operation of the image forming apparatus 10 by executing a predetermined process based on a control program stored in the memory 12 or the storage device 13.

The present exemplary embodiment describes that the CPU 11 reads and executes the control program stored in the memory 12 or the storage device 13. However, the program may be stored in a storage medium such as a CD-ROM and may be then provided to the CPU 11.

The print engine 19 prints an image on a recording medium such as a printing sheet. The scanner 17 performs a process of reading an image of a set document. The display 18 displays various types of information such as an operation screen for a user. In the present exemplary embodiment, a touch panel is implemented by the display 18 and an operation input unit that receives a user operation. The scanner 17, the display 18, and the print engine 19 are controlled by the device controller 15.

The LAN controller 14 transmits/receives data to/from the terminal device 20 via a wired LAN line. The USB controller 16 transmits/receives data to/from a USB-connected external device.

When the above-described control program is executed, the CPU 11 implements an external CPU device connection controller 21 and a display controller 22 as functional elements.

The display controller 22 controls the display screen displayed on the display 18 based on function information stored in the memory 12 as display function information.

The external CPU device connection controller 21 detects the presence or absence of the USB-connected external CPU device 40, and performs a control for switching a process in the image forming apparatus 10 when the presence of the USB-connected external CPU device is detected.

Meanwhile, the storage device 13 stores basic function information 31. FIG. 3 illustrates an example of the basic function information 31. The basic function information 31 indicates a basic function that is executable by the image forming apparatus 10 alone even in a state where the external CPU device 40 is not connected to the image forming apparatus 10.

As illustrated in FIG. 3, the basic function information 31 includes a function item 1, a function item 2, and a processing location item. Here, the function item 1 represents function items classified into major categories such as, for example, print, scan, and copy. The function item 2 represents function items classified into sub-categories from the major categories in the function item 1, such as, for example, "normal mode" and "high compression mode" in the scan item.

Here, the normal mode compresses and stores scanned image data according to a standard such as the JPEG (a compression method defined by the International Organization for Standardization). The high compression mode compresses scanned image data with a higher compression ratio than that for the normal mode, and aims to reduce the amount of image data, in spite of the deterioration of image quality.

Meanwhile, a processing location indicating a location where a function is executed is set for each function item. In FIG. 3, "image forming apparatus" is set as a processing location where the "normal mode" and the "high compression mode" are executed. That is, this indicates that the scanning processes of "normal mode" and "high compression mode" are both executed in the image forming apparatus 10.

Descriptions will be made on an aspect in which the image forming apparatus 10 is powered on in a state where the external CPU device 40 is not connected to the image forming apparatus 10, and a UI display control is performed based on the basic function information 31.

Figure 4:
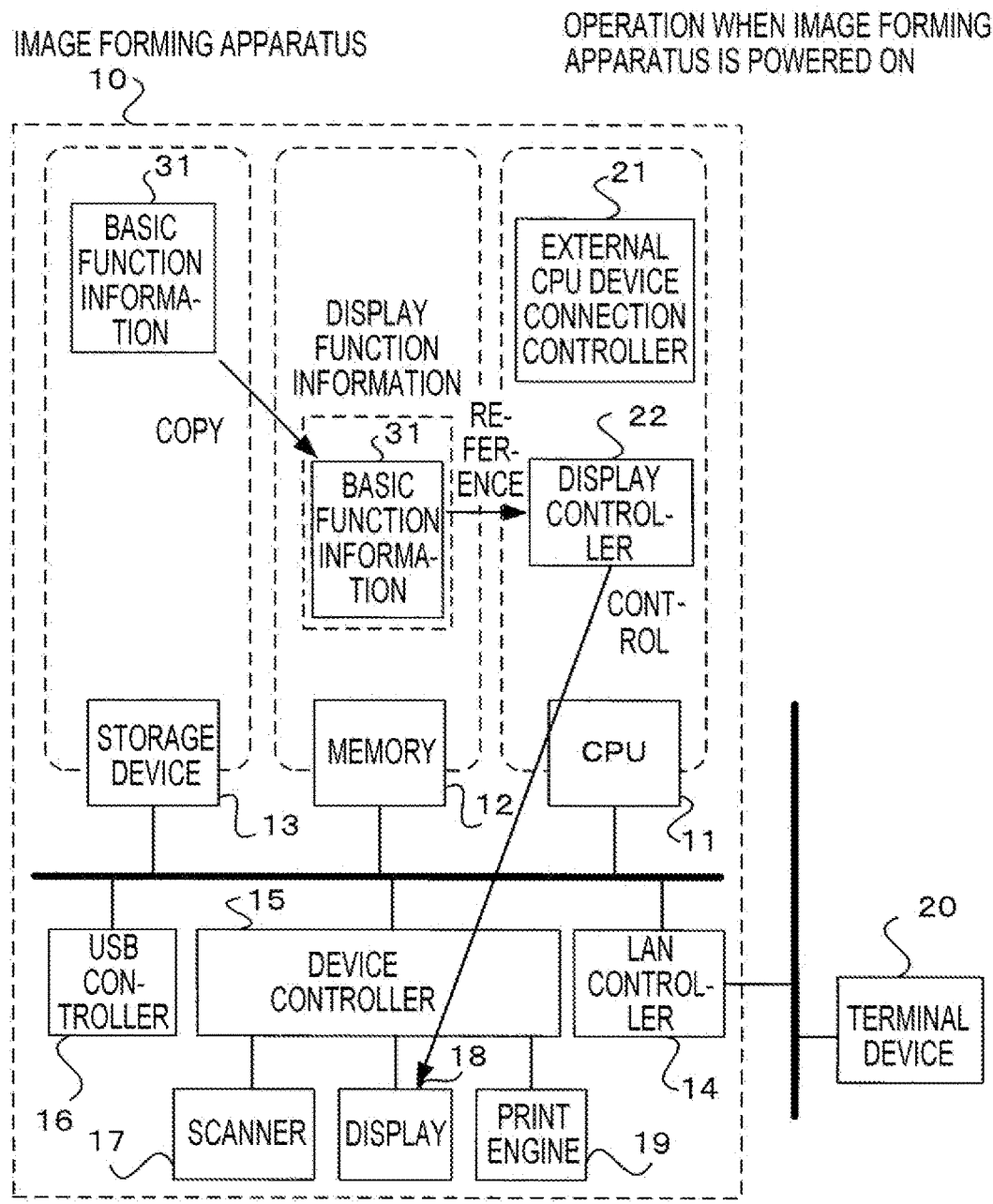

An operation when the image forming apparatus 10 in the state illustrated in FIG. 2 is powered on will be described with reference to FIG. 4.

In a case where the external CPU device 40 is not connected to the image forming apparatus 10 when the image forming apparatus 10 is powered on, the basic function information 31 in the storage device 13 is copied into the memory 12 as display function information. Therefore, the display controller 22 performs a UI display control on the display 18 by referring to the basic function information 31.

Figure 5:
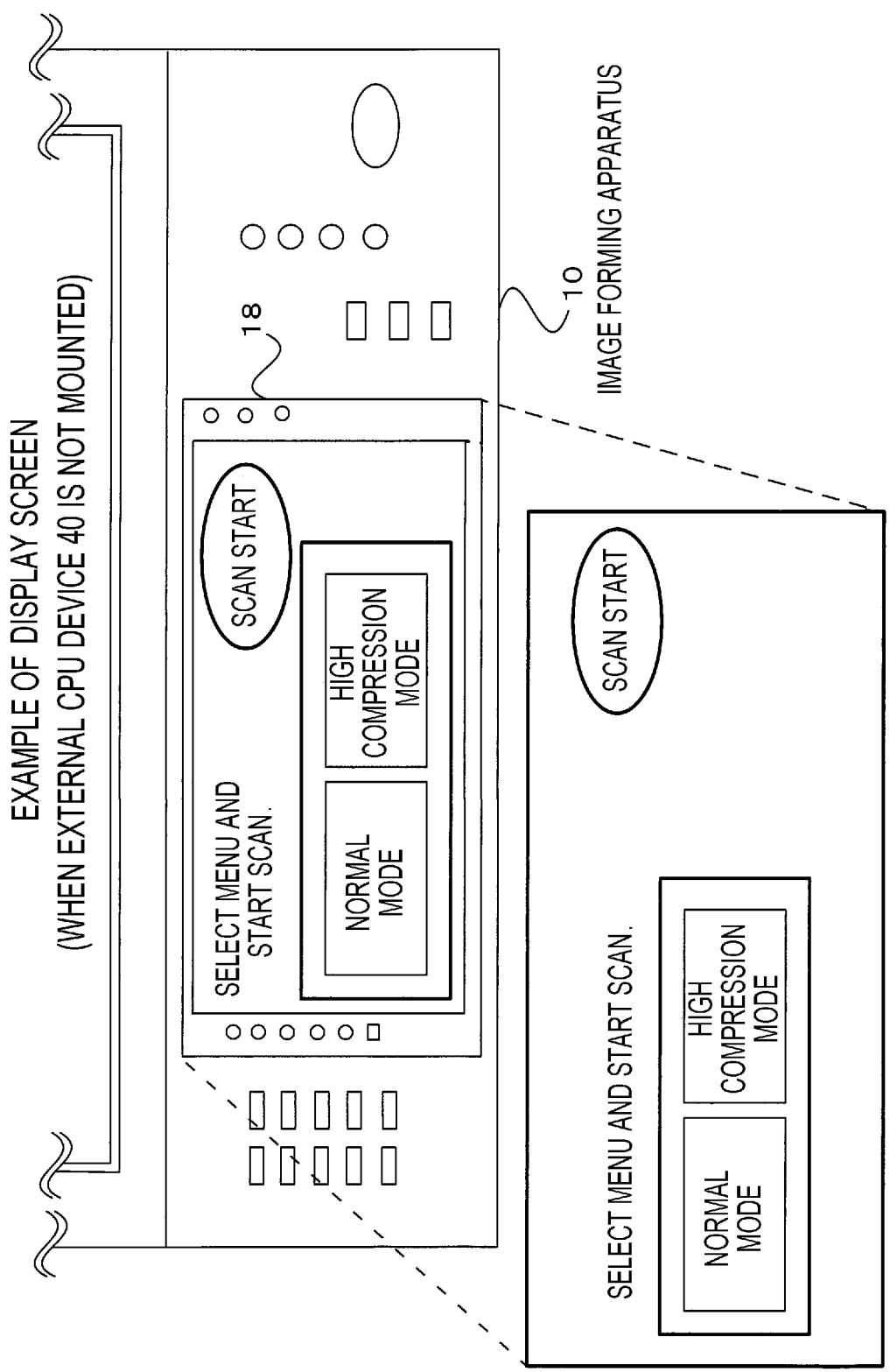
FIG. 5 is a view illustrating an example of a display screen displayed on a display by a UI display control based on the basic function information.

FIG. 5 illustrates an example of a display screen displayed on the display 18 by the UI display control. FIG. 5 represents an example of a display screen when a user selects a scan function, and the display screen displays the "normal mode" and the "high compression mode" as selectable scan modes.

Next, operation performed when the external CPU device 40 is connected to the image forming apparatus 10 will be described with reference to FIG. 6.

Prior to describing the operation, the configuration of the external CPU device 40 will be described.

Figure 6:
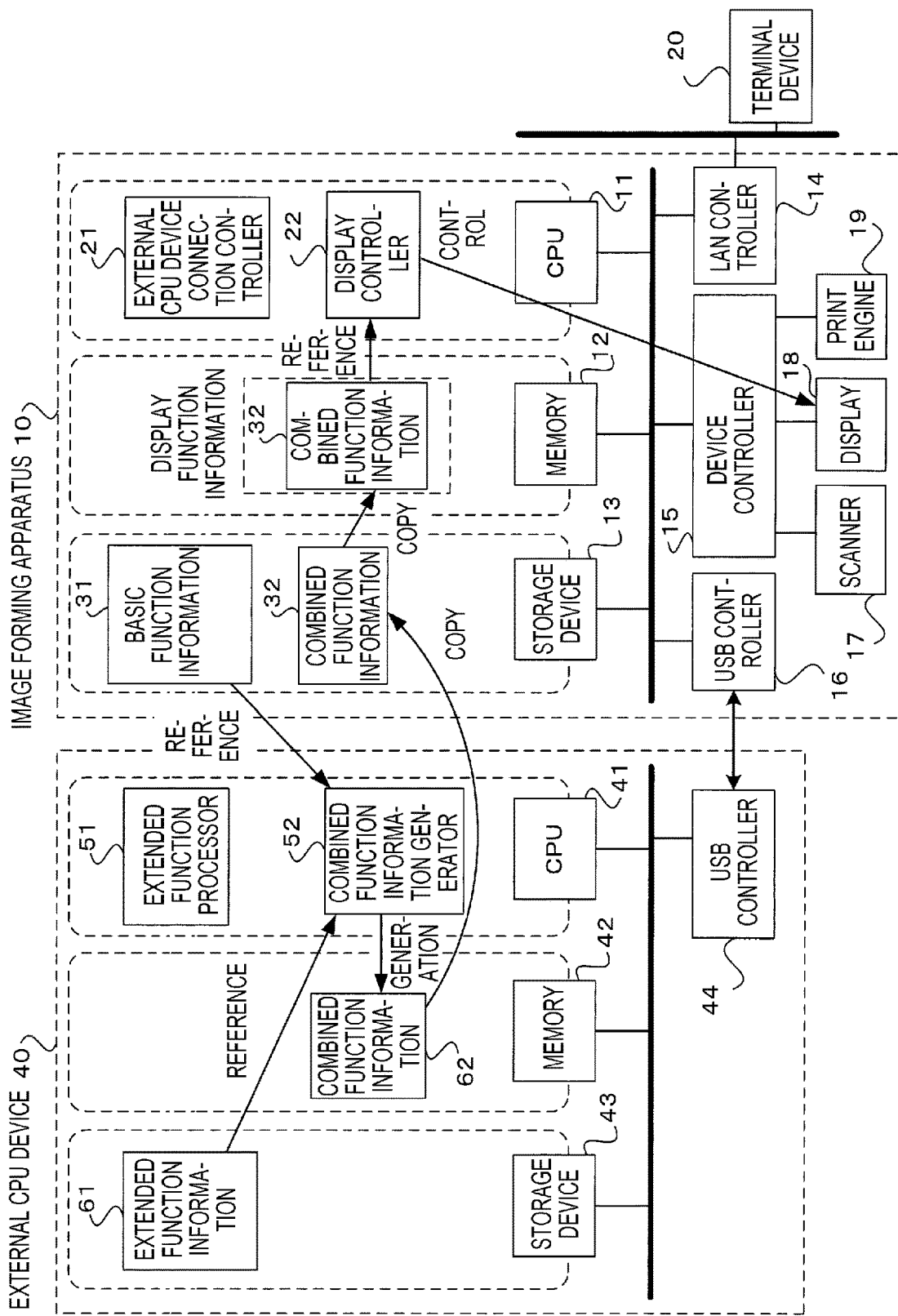
FIG. 6 illustrates operation performed when an external CPU device is connected to the image forming apparatus.

As illustrated in FIG. 6, the external CPU device 40 includes a CPU 41, a memory 42, a nonvolatile storage device 43 such as an HDD or a flash memory, and a USB controller 44. These elements are interconnected via a control bus.

The CPU 41 controls the operation of the external CPU device 40 by executing a predetermined process based on a control program stored in the memory 42 or the storage device 43.

When the above-described control program is executed, the CPU 41 implements an extended function processor 51 and a combined function information generator 52 as functional elements.

The extended function processor 51 executes a process based on an extended function on various data transmitted from the image forming apparatus 10 when the external CPU device 40 is connected to the image forming apparatus 10. For example, when the extended function is a high compression PDF process, the extended function processor 51 executes the high compression PDF process on scanned data transmitted from the image forming apparatus 10.

When the external CPU device 40 is connected to the image forming apparatus 10, the combined function information generator 52 acquires the basic function information 31 from the image forming apparatus 10, combines the acquired basic function information 31 and the extended function information 61 stored in the storage device 43 with each other to generate combined function information 62, and stores the combined function information 62 in the memory 42.

The storage device 43 stores the extended function information 61. FIG. 7 illustrates an example of the extended function information 61. The extended function information 61 indicates an extended function that is executable when the external CPU device 40 is connected to the image forming apparatus 10.

As illustrated in FIG. 7, like the basic function information 31, the extended function information 61 includes a function item 1, a function item 2, and a processing location item. In the following description, to simplify the descriptions, only an extended function related to the scan function will be described. In the extended function information 61 illustrated in FIG. 7, two function items of "high compression mode" and "high compression PDF" are set in the function item 2, and "external CPU device" is set as the processing location of each of the function items.

FIG. 7 represents an aspect in which the combined function information generator 52 generates the combined function information 62 by combining the basic function information 31 and the extended function information 61 with each other.

In the combined function information 62, three function items of "normal mode", "high compression mode", and "high compression PDF" are set in the function item 2 associated with the scan item, as a result of the combination of the basic function information 31 and the extended function information 61. Further, "image forming apparatus", "external CPU device", and "external CPU device" are set as processing locations for the three function items, respectively.

That is, according to the combined function information 62, when the external CPU device 40 is connected to the image forming apparatus 10, it means that a process executable in the image forming apparatus 10 is executed for the "normal mode" and a process executable in the external CPU device 40 is executed for the "high compression mode" or the "high compression PDF".

Referring to FIG. 6, the combined function information 62 generated by the combined function information generator 52 is stored in the memory 42 of the external CPU device 40. Then, the combined function information 62 is transferred to the image forming apparatus 10 via the USB controller 44 and the USB controller 16, and is stored as combined function information 32 in the storage device 13 of the image forming apparatus 10.

The combined function information 32 stored in the storage device 13 is copied onto the memory 12 as display function information. Then, the display controller 22 in the image forming apparatus 10 performs the UI display control on the display 18 based on the combined function information 32 in the memory 12.

Figure 8:
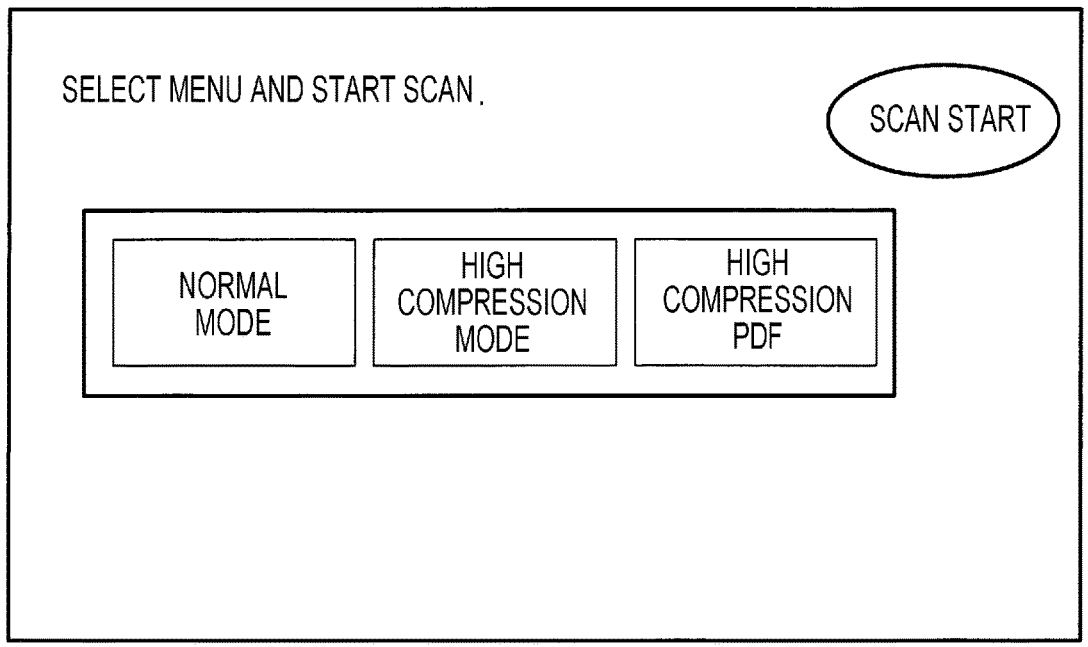
FIG. 8 is a view illustrating an example of a display screen displayed on the display by the UI display control based on combined function information.

FIG. 8 illustrates an example of a display screen displayed on the display 18 by the UI display control. FIG. 8 illustrates an example of a display screen when a user selects a scan function. As can be seen, the display screen displays the "high compression PDF" as a selectable scan mode, in addition to the "normal mode" and the "high compression mode". That is, when the external CPU device 40 is connected to the image forming apparatus 10, an operation button of "high compression PDF" is additionally displayed for the user.

In this way, when the external CPU device 40 is connected to the image forming apparatus 10 to extend the functions of the image forming apparatus 10, the display controller 22 combines the information representing the basic function provided in the image forming apparatus 10 and the information representing the extended function added by the external CPU device 40 with each other, and displays the combined information on one screen.

The user may select the function of "high compression PDF" executable by the external CPU device 40, by pressing an operation button of "high compression PDF". The user may select the function of "high compression mode" executable by the external CPU device 40, by pressing an operation button of "high compression mode".

Next, operation performed when the external CPU device 40 is disconnected from the image forming apparatus 10 in the state described above will be described.

First, FIGS. 9A to 9D illustrate an example of transition of a display screen when the image forming apparatus 10 of the present exemplary embodiment is not used. In general, when an external CPU device is connected to a certain apparatus to extend the functions of the apparatus, and is then disconnected from the apparatus, an operation screen displayed for a user may return to the state before the external CPU device is connected to the apparatus. FIGS. 9A to 9D represent an example of transition of a display screen when the general process is performed.

Figure 9A:
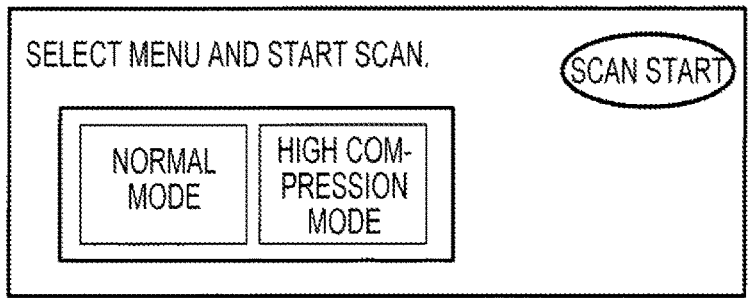
FIGS. 9A to 9D are each a view illustrating an example of transition of a display screen when the image forming apparatus of the present exemplary embodiment is not used.
Figure 9B:
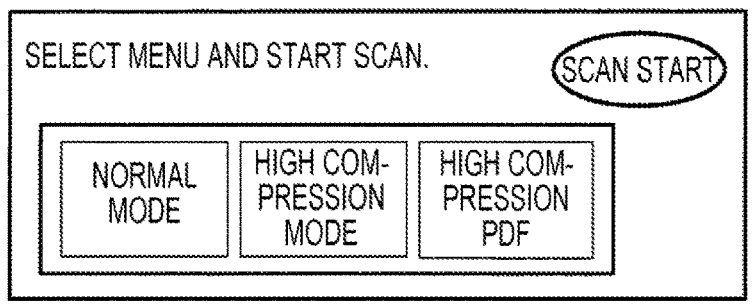

First, FIG. 9A illustrates a display screen before the external CPU device is connected to the apparatus. In this state, when the external CPU device is connected to the apparatus, the display screen transitions to the display screen illustrated in FIG. 9B. It can be seen that a selection button of "high compression PDF" is added in the display screen of FIG. 9B, as in the display screen of FIG. 8.

Figure 9C:
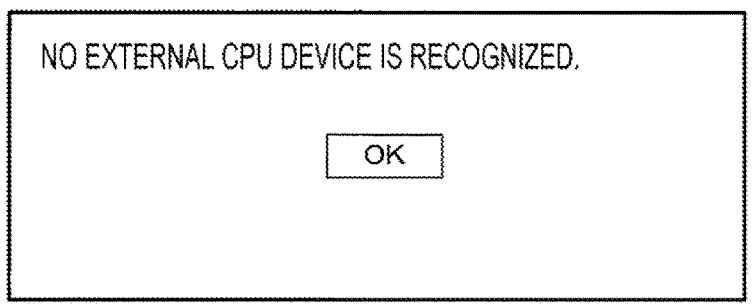
Figure 9D:
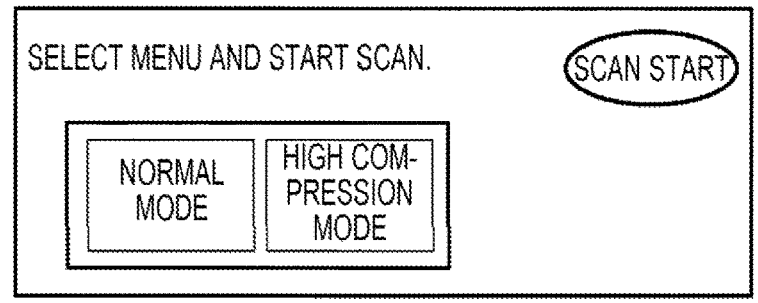

Then, in this state, when the external CPU device is disconnected from the apparatus, for example, the display screen illustrated in FIG. 9C is displayed to notify the user of the disconnection of the external CPU device. Then, when the user presses an "OK" button in the display screen of FIG. 9C, the display screen transitions to the display screen illustrated in FIG. 9D. The display screen of FIG. 9D is the same as the display screen of FIG. 9A which is the display screen before the external CPU device is connected to the apparatus.

When the screen transition occurs as illustrated in FIGS. 9A to 9D, for example, a user who has frequently used the "high compression PDF" may be confused in performing the operation for the "high compression PDF" because the operation button for selecting the "high compression PDF" disappears in an event where another user disconnects the external CPU device from the apparatus.

Therefore, in the image forming apparatus 10 of the present exemplary embodiment, a process that will be described below is performed, so that the external CPU device 40 is once connected to the image forming apparatus 10 to enable an extended function, and the user may know the enabled extended function even when the external CPU device 40 is disconnected from the image forming apparatus 10 later.

Figure 10:
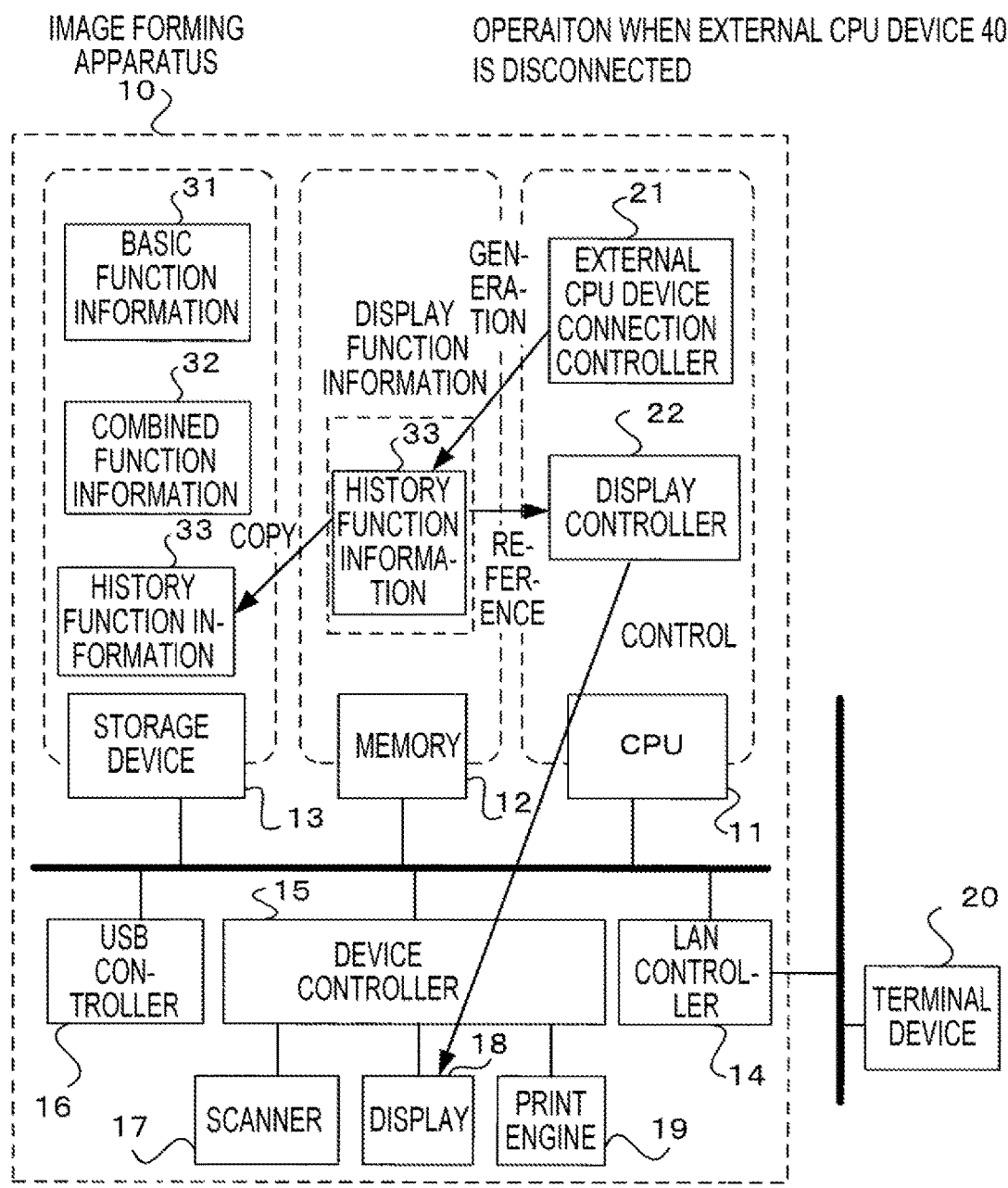
FIG. 10 illustrates the operation of the image forming apparatus when the external CPU device is disconnected.

Next, an operation of the image forming apparatus 10 when the external CPU device 40 is disconnected from the image forming apparatus 10 will be described with reference to FIG. 10.

When it is detected that the external CPU device 40 is disconnected from the image forming apparatus 10, the external CPU device connection controller 21 generates history function information 33 based on the basic function information 31 and the combined function information 32 in the storage device 13. The history function information 33 is stored as display function information in the memory 12, and is also copied into and stored in the storage device 13.

The memory 12 stores the combined function information 32 which is the combined information obtained by combining the information indicating the basic function provided in the image forming apparatus 10 and its processing location and the information indicating the extended function added by the external CPU device 40 and its processing location with each other, when the external CPU device 40 is connected to the image forming apparatus 10. When the connection with the external CPU device 40 is released, the external CPU device connection controller 21 deletes the information indicating the processing location of the extended function in the stored combined function information 32, and generates the function history information 33 by adding information indicating that the processing location was the external CPU device 40 in the past.

FIG. 11 illustrates an example of the history function information 33 generated by the external CPU device connection controller 21 as described above.

The history function information 33 illustrated in FIG. 11 indicates both a function that is enabled in a state where the external CPU device 40 is not connected and a function that is enabled in a state where the external CPU device 40 is connected.

As illustrated in FIG. 11, the history function information 33 includes a function item 1, a function item 2, information of a processing location in the current state, and information of a processing location in the past state where the external CPU device 40 was connected.

Specifically, in the history function information 33 of FIG. 11, three function items of "normal mode", "high compression mode", and "high compression PDF" are set in the function item 2 associated with the scan item. As can be seen, for the three function items, processing locations of "image forming apparatus", "image forming apparatus", and "x" are set in the item "processing location (present)". Here, regarding the function of "high compression PDF" with a processing location marked with "x", it means that there is no processing location, that is, the function of "high compression PDF" is not executable in a state where the external CPU device 40 is not connected.

As can be seen, for the three function items of "normal mode", "high compression mode", and "high compression PDF", processing locations of "image forming apparatus", "external CPU device", and "external CPU device" are set in the item "processing location (past)".

When the history function information 33 is stored in the memory 12, the display controller 22 performs the UI display control on the display 18 based on the history function information 33.

Figure 12:
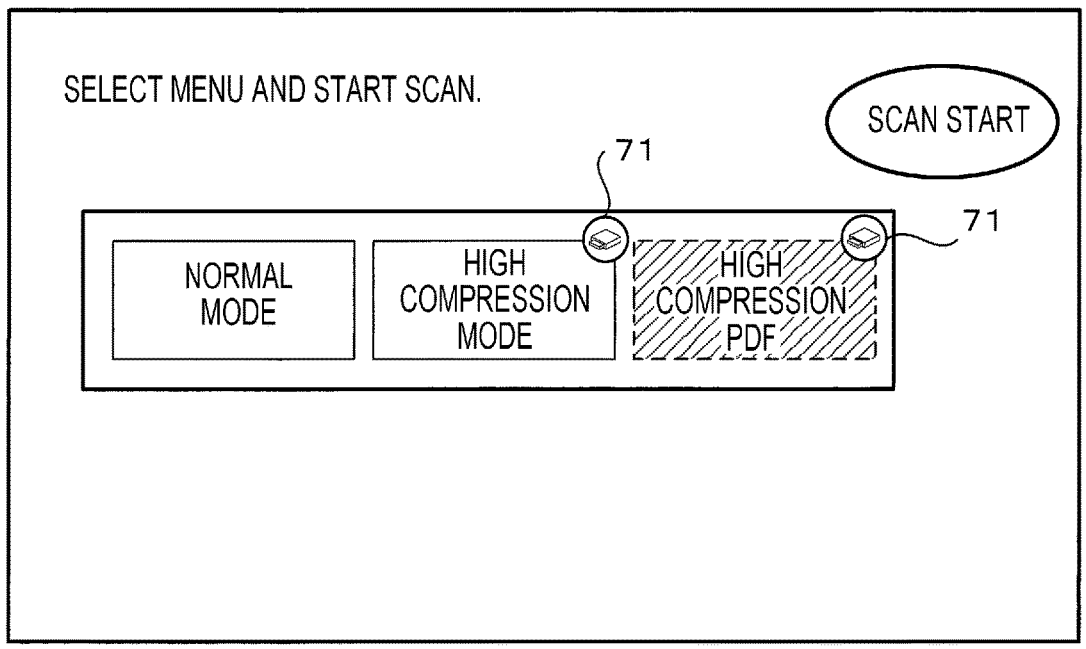
FIG. 12 is a view illustrating an example of a display screen displayed on the display by the UI display control based on the history function information.

FIG. 12 illustrates an example of a display screen displayed on the display 18 by the UI display control. FIG. 12 represents an example of a display screen when a user selects a scan function, and the display screen displays the "normal mode", the "high compression mode", and the "high compression PDF" as selectable scan modes.

However, the display screen of FIG. 12 displays the selection button of "high compression PDF" in a grayed-out state, so as to indicate that the selection button of "high compression PDF" cannot be actually selected. In the display screen of FIG. 12, an icon 71 representing the external CPU device 40 is additionally displayed at the upper right portion of each of the two selection buttons of "high compression mode" and "high compression PDF".

The icon 71 shows to the user that the corresponding function is currently unavailable because the external CPU device 40 is not connected, or that the function is available only with a lower performance than that in a case where the external CPU device 40 is connected.

As described above, when the connection with the external CPU device 40 is released, the display controller 22 displays the information representing the extended function so as to indicate that the extended function becomes available when the external CPU device 40 is connected.

That is, the display controller 22 displays the information representing the extended function so as to indicate that the extended function is currently unavailable. For a function that executes a relatively high-performance process when the external CPU device 40 is connected as an extension device, when the connection with the external CPU device 40 is released, the display controller 22 displays information indicating the function so as to indicate that the relatively high-performance process is executed when the external CPU device 40 is connected.

The display controller 22 displays information that may specify an external CPU device 40 to be connected, together with the information representing the extended function. Specifically, the display controller 22 displays information on a product name or product number of an external CPU device 40 to be connected, as the information that may specify an external CPU device 40 to be connected.

Figure 13:
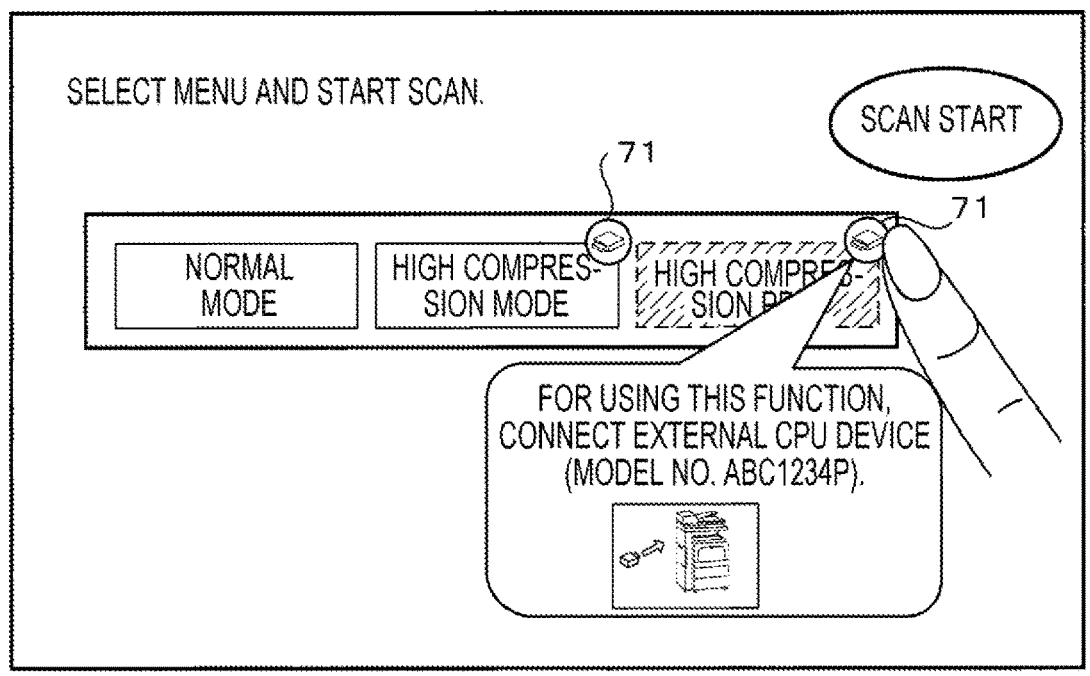
FIG. 13 is a view illustrating an example of a display screen displayed when a user touches an icon at an upper right portion of an operation button of "high compression PDF"

For example, when the user touches the icon 71 at the upper right portion of the operation button of "high compression PDF", a message indicating "For using this function, connect an external CPU device (Model No. ABC1234P)", and an image representing a state of connecting the external CPU device 40 to the image forming apparatus 10 are displayed as illustrated in FIG. 13.

Figure 14:
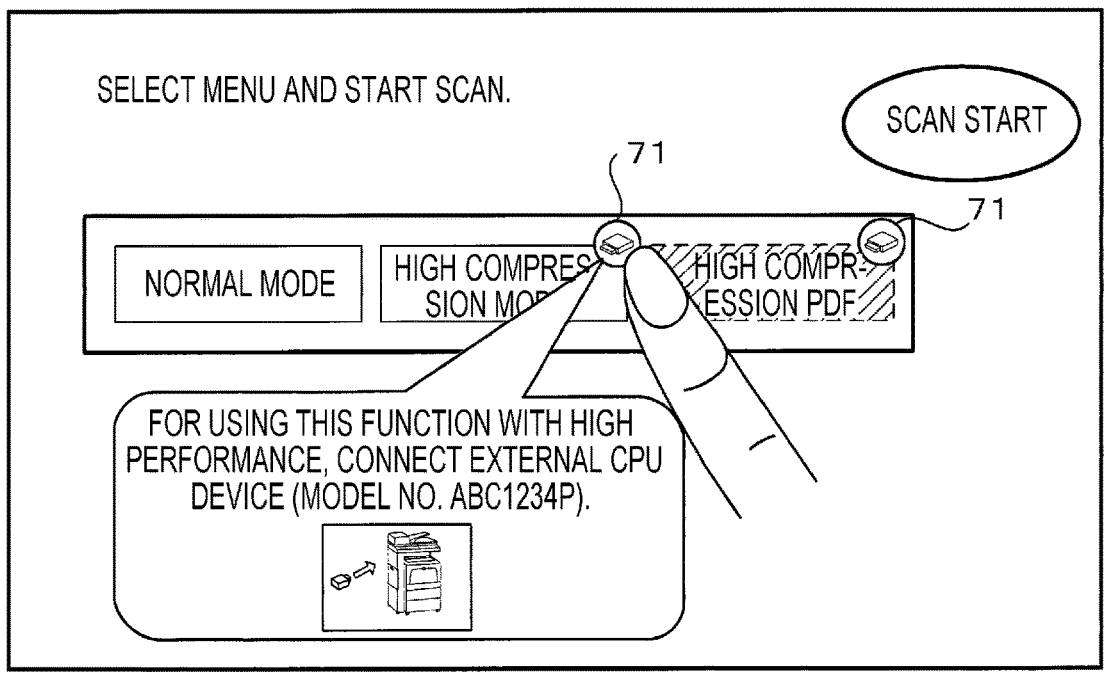
FIG. 14 is a view illustrating an example of a display screen displayed when the user touches an icon at an upper right portion of an operation button of "high compression mode"

When the user touches the icon 71 at the upper right portion of the operation button of "high compression mode", a message indicating "For using this function with high performance, connect an external CPU device (Model No. ABC1234P)", and an image representing a state of connecting the external CPU device 40 to the image forming apparatus 10 are displayed as illustrated in FIG. 14.

That is, the user can know from the display screens of FIGS. 12 to 14 that the function of "high compression PDF" is currently unavailable but becomes available by connecting the external CPU device 40 with Model No. ABC1234P, or that the function of "high compression mode" is currently available with a normal performance but available with a high performance by connecting the external CPU device 40 with Model No. ABC1234P.

Figure 15A:
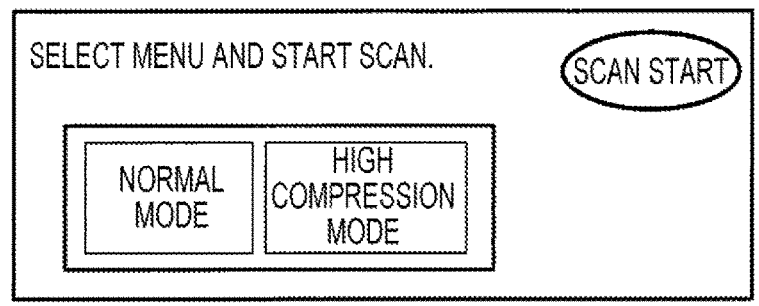
FIGS. 15A to 15C are each a view illustrating transition of a display screen by the image forming apparatus according to an exemplary embodiment of the present disclosure.
Figure 15B:
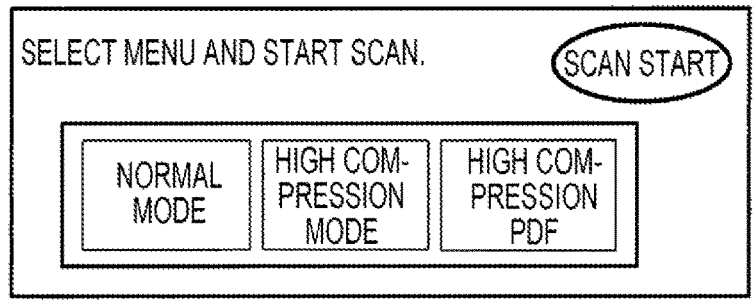
Figure 15C:
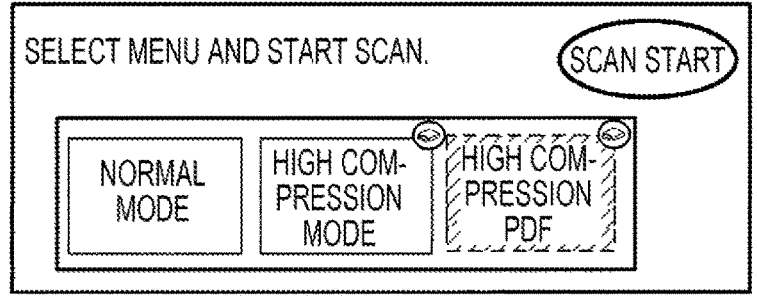

Next, FIGS. 15A to 15C illustrate transition of the display screen by the image forming apparatus 10 of the present exemplary embodiment.

First, FIG. 15A illustrates a display screen before the external CPU device 40 is connected. In this state, when the external CPU device 40 is connected, the display screen transitions to the display screen illustrated in FIG. 15B. In the display screen of FIG. 15B, the selection button of "high compression PDF" is added to the display screen of FIG. 15A.

Then, in this state, when the external CPU device 40 is disconnected, the display screen transitions to the display screen illustrated in FIG. 15C as described above. The display screen of FIG. 15C displays contents different from those in the display screen of FIG. 15A which is the display screen before the external CPU device 40 is connected. In the display screen of FIG. 15C, the operation button of "high compression PDF" is displayed in a grayed-out state, and an icon representing an external CPU device is additionally displayed at the upper right portion of each of the operation buttons of "high compression mode" and "high compression PDF".

Figure 16:
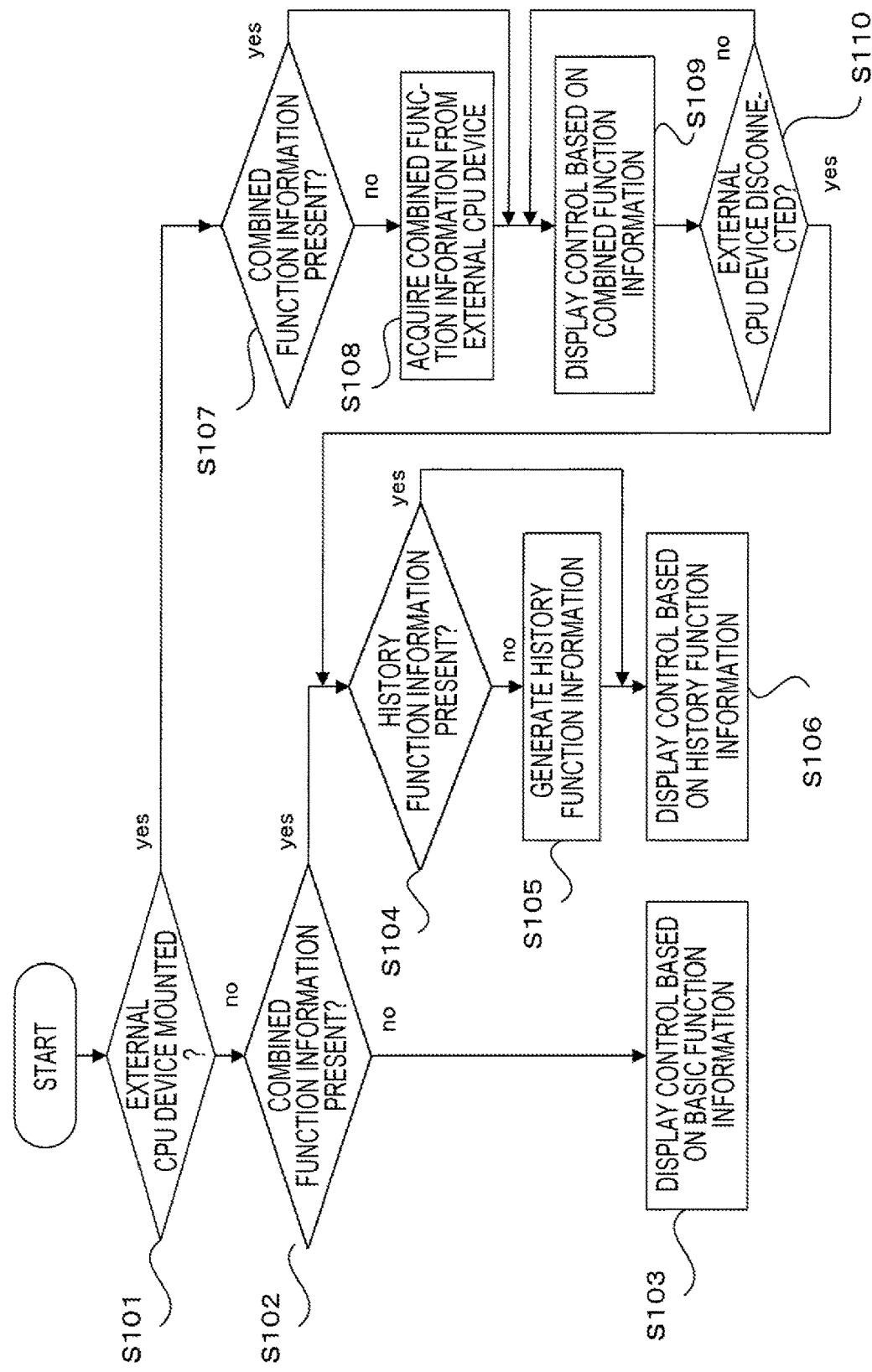

Next, an operation of the above-described UI display control when the image forming apparatus 10 is powered on will be described with reference to a flowchart of FIG. 16.

When the image forming apparatus 10 is powered on, the external CPU device connection controller 21 determines whether or not the external CPU device 40 is mounted, in step S101.

When it is determined in step S101 that the external CPU device 40 is mounted, the display controller 22 determines whether or not the combined function information 32 is stored in the storage device 13 or the memory 12 of the image forming apparatus 10, in step S102.

Then, when it is determined in step S102 that the combined function information 32 does not exist in the image forming apparatus 10, the display controller 22 performs the UI display control based on the basic function information 31, in step S103.

When it is determined in step S102 that the combined function information 32 exists in the image forming apparatus 10, the display controller 22 determines whether or not the history function information 33 exists in the image forming apparatus 10, in step S104.

Then, when it is determined in step S104 that the history function information 33 does not exist in the own apparatus, the external CPU device connection controller 21 generates the history function information 33 based on the basic function information 31 and the combined function information 32, in step S105.

Then, when it is determined in step S104 that the history function information 33 exists in the own apparatus, and when the history function information 33 is generated in step S105, the display controller 22 performs the UI display control based on the history function information 33, in step S106.

When it is determined in step S101 that the external CPU device 40 is not mounted, the display controller 22 determines whether or not the combined function information 32 is stored in the storage device 13 or the memory 12 in the image forming apparatus 10, in step S107.

Then, when it is determined in step S107 that the combined function information 32 does not exist in the image forming apparatus 10, in step S108, the external CPU device connection controller 21 acquires the combined function information 62 from the external CPU device 40, and stores the acquired combined function information 62 as the combined function information 32 in the image forming apparatus 10.

Next, when it is determined in step S107 that the combined function information 32 exists in the own apparatus, and when the combined function information 32 is generated in step S108, the display controller 22 performs the UI display control based on the combined function information 32, in step S109.

In step S110, when the external CPU device connection controller 21 determines that the external CPU device 40 has been disconnected during the UI display control by the display controller 22 based on the combined function information 32, the control proceeds to the process of step S104.

That is, the display controller 22 performs the UI display control based on the history function information 33 in step S106.

Figure 17:
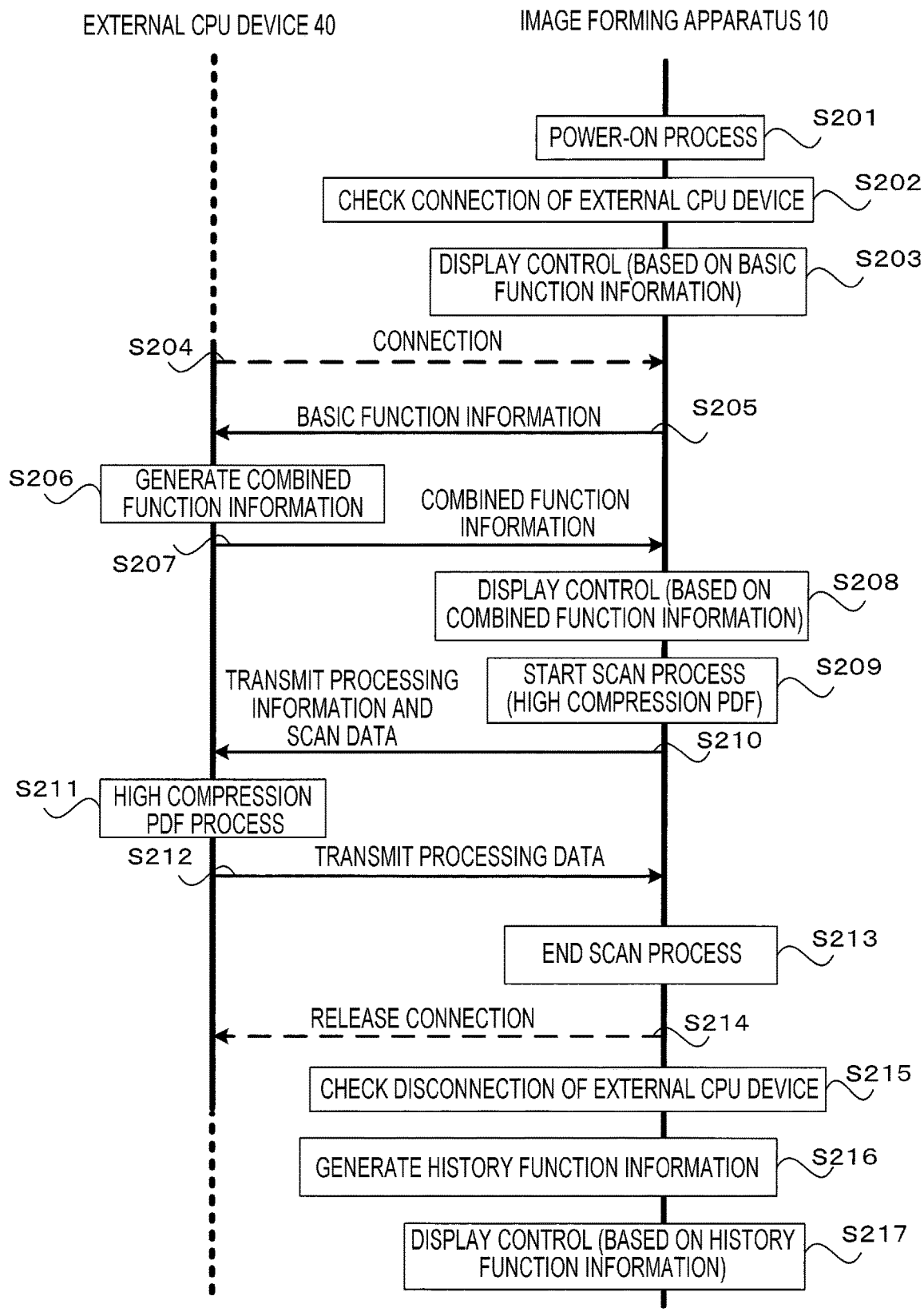
FIG. 17 is a sequence chart of transmission/reception of data between the image forming apparatus and the external CPU device.

Next, a sequence chart of FIG. 17 represents transmission/reception of data between the image forming apparatus 10 and the external CPU device 40 in the above-described process.

First, when the image forming apparatus 10 is powered on in a state where the external CPU device 40 is not connected, a power-on process is executed in step S201. Thereafter, in the image forming apparatus 10, the external CPU device connection controller 21 executes a process of checking the connection of an external CPU device, in step S202. When an external CPU device 40 is not connected, the display controller 22 performs the UI display control based on the basic function information 31, in step S203.

Descriptions will be made assuming that the external CPU device 40 is connected to the image forming apparatus 10 in step S204 in the state described above.

Then, in step S205, the basic function information 31 is transferred from the image forming apparatus 10 to the external CPU device 40.

Then, in the external CPU device 40, in step S206, the combined function information generator 52 combines the basic function information 31 and the extended function information 61 with each other to generate the combined function information 62. In step S207, the combined function information 62 is transferred from the external CPU device 40 to the image forming apparatus 10, and stored as the combined function information 32 in the image forming apparatus 10. As a result, in step S208, the display controller 22 in the image forming apparatus 10 performs the UI display control based on the combined function information 32.

Here, descriptions will be made assuming that a user makes an instruction to start a scanning process by selecting the "high compression PDF" in step S209.

Then, in step S210, the external CPU device connection controller 21 transmits scan data and processing information to the external CPU device 40.

In step S211, the extended function processor 51 in the external CPU device 40 that has received the scan data and the processing information executes a high compression PDF process on the received processing information and scan data. Then, in step S212, the extended function processor 51 transmits the processed data to the image forming apparatus 10. When receiving the processed data from the external CPU device 40, the image forming apparatus 10 ends the scanning process in step S213.

Then, descriptions will be made assuming that the connection of the external CPU device 40 is released in step S214. When it is detected in step S215 that the external CPU device 40 is not connected, in step S216, the external CPU device 21 generates the history function information 33 from the basic function information 31 and the combined function information 32. Then, in step S217, the display controller 22 performs the UI display control based on the history function information 33.

In the above-described exemplary embodiment, when the external CPU device is connected to the image forming apparatus 10, the UI display control is performed by the display controller 22 of the image forming apparatus 10.

However, when an external CPU device provided with a display control function is connected to the image forming apparatus 10, a display controller of the external CPU device may perform the UI display control.

Such a configuration in which the display control function for performing the UI display control on the image forming apparatus 10 is added to the external CPU device 40 will be described as an external CPU device 40a.

Figure 18:
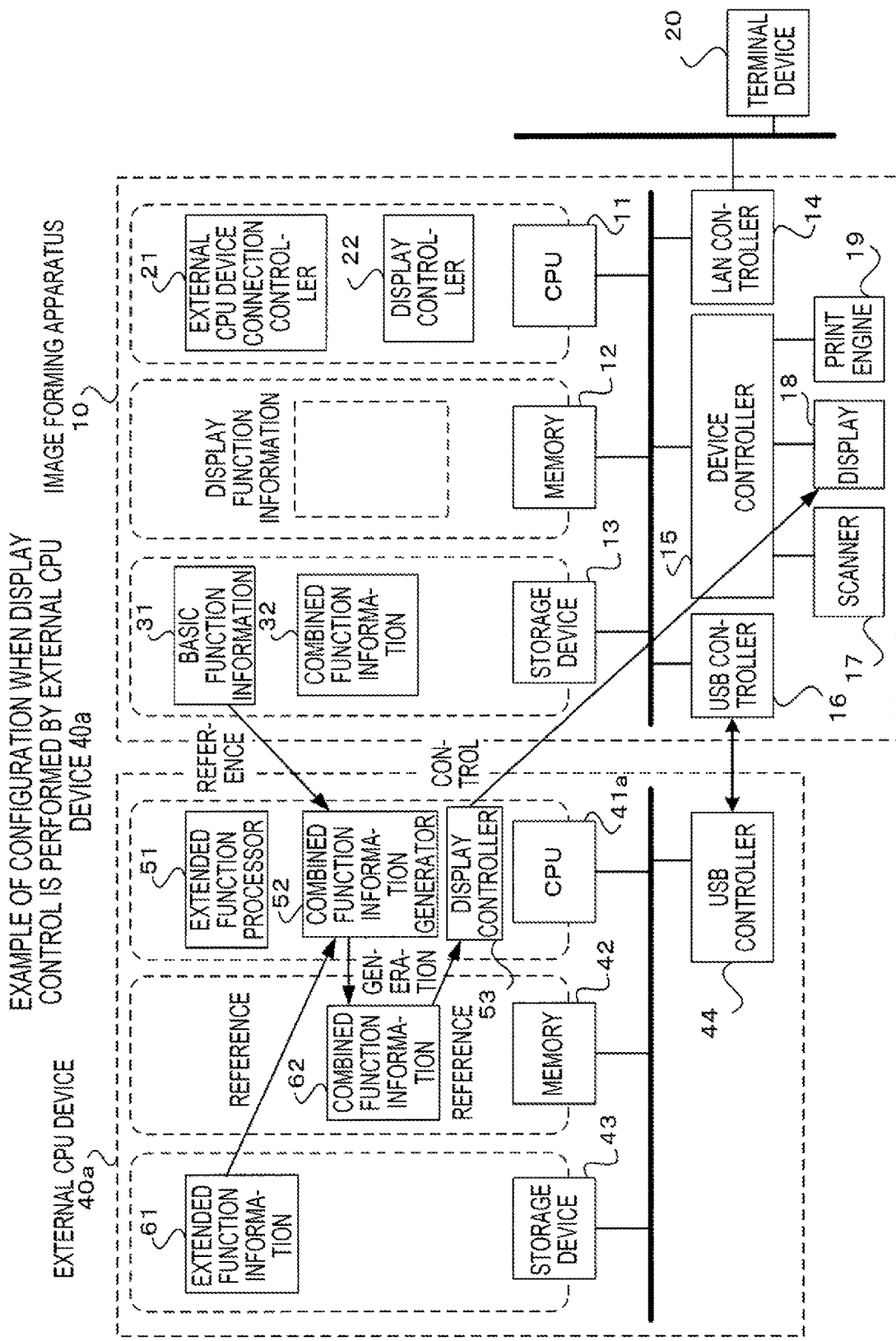
FIG. 18 is a view illustrating operation performed when an external CPU device having a display control function of performing the UI display control on the image forming apparatus is connected to the image forming apparatus.

FIG. 18 illustrates operation performed when the external CPU device 40a is connected to the image forming apparatus 10.

Referring to FIG. 18, the external CPU device 40a is different from the above-described external CPU device 40 in that a display controller 53 is provided in a CPU 41a of the external CPU device 40a.

In such a configuration, in a state where the external CPU device 40a is connected to the image forming apparatus 10, the display controller 53 performs the UI display control on the display 18 of the image forming apparatus 10 based on the combined function information 62 stored in the memory 42. This UI display control also enables the display screen illustrated in FIG. 8 to be displayed on the display 18.

When the external CPU device 40a is disconnected from the image forming apparatus 10, the display controller 22 of the image forming apparatus 10 takes over and performs the UI display control on the display 18.

In each exemplary embodiment described above, the processor refers to a processor in a broad sense and includes a general-purpose processor (for example, central processing unit (CPU)) or a dedicated processor (for example, a graphics processing unit (GPU), an application specific integrated circuit (ASIC), a field programmable gate array (FPGA) or a programmable logic device).

In each exemplary embodiment described above, the operation of the processor may be performed not only by one processor but also by a cooperation of plural processors present at physically separated positions. The sequence of operations of the processor is not limited to the sequence described in each exemplary embodiment described above, but may be appropriately changed.

MODIFICATIONS

In the exemplary embodiments described above, the case where the external CPU device 40 or 40a is connected to the image forming apparatus 10 to extend the functions of the image forming apparatus 10 has been described. However, the present disclosure is not limited thereto. For example, the present disclosure may be similarly applied to a case where an external CPU device is connected to an information processing apparatus other than the image forming apparatus to extend the functions of the information processing apparatus.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a memory; and
a processor configured to:
when an extension device that extends functions of the information processing apparatus by being connected to the information processing apparatus is connected to the information processing apparatus, display: (i) information representing a basic function provided in the information processing apparatus; and (ii) information representing an extended function added by the extension device on one screen together; and
when the connection with the extension device is released, display the information representing the extended function so as to indicate that the extended function becomes available when the extension device is connected to the information processing apparatus, wherein
when the extension device is connected to the information processing apparatus, the memory stores combined information that is a combination of: (a) information representing (a1) the basic function provided in the information processing apparatus, and (a2) a processing location of the basic function; and (b) information representing (b1) the extended function added by the extension device, and (b2) a processing location of the extended function, and
when the connection with the extension device is released, the processor is configured to delete the information on the processing location of the extended function in the stored combined information.

2. The information processing apparatus according to claim 1, wherein the processor is configured to display the information representing the extended function so as to indicate that the extended function is currently unavailable.

3. The information processing apparatus according to claim 1, wherein when the connection with the extension device is released, the processor displays a function that executes a relatively high-performance process when the extension device is connected to the information processing apparatus, so as to indicate that the relatively high-performance process is executed when the extension device is connected to the information processing apparatus.

4. The information processing apparatus according to claim 1, wherein the processor is configured to display information that specifies an extension device to be connected, together with the information representing the extended function.

5. The information processing apparatus according to claim 4, wherein the information that specifies the extension device to be connected is information on a product name or a product number of the extension device to be connected.

6. The information processing apparatus according to claim 1, wherein when the connection with the extension device is released, the processor deletes the information on the processing location of the extended function in the stored combined information, and adds information representing that the processing location was the extension device in past.

7. A non-transitory computer readable medium storing a program that causes a computer of an information processing apparatus to execute information processing, the information processing apparatus comprising a memory, and the information processing comprising:
when an extension device that extends functions of the information processing apparatus by being connected to the information processing apparatus is connected to the information processing apparatus, displaying: (i) information representing a basic function provided in the information processing apparatus; and (ii) information representing an extended function added by the extension device on one screen together; and
when the connection with the extension device is released, displaying the information representing the extended function so as to indicate that the extended function becomes available when the extension device is connected to the information processing apparatus, wherein
when the extension device is connected to the information processing apparatus, the memory stores combined information that is a combination of: (a) information representing (a1) the basic function provided in the information processing apparatus, and (a2) a processing location of the basic function; and (b) information representing (b1) the extended function added by the extension device, and (b2) a processing location of the extended function, and
when the connection with the extension device is released, the information processing further comprising deleting the information on the processing location of the extended function in the stored combined information.

8. An information processing apparatus comprising:
memory means;
when an extension device that extends functions of the information processing apparatus by being connected to the information processing apparatus is connected to the information processing apparatus, means for displaying: (i) information representing a basic function provided in the information processing apparatus; and (ii) information representing an extended function added by the extension device on one screen together;
when the connection with the extension device is released, means for displaying the information representing the extended function so as to indicate that the extended function becomes available when the extension device is connected to the information processing apparatus, wherein
when the extension device is connected to the information processing apparatus, the memory means stores combined information that is a combination of: (a) information representing (a1) the basic function provided in the information processing apparatus, and (a2) a processing location of the basic function; and (b) information representing (b1) the extended function added by the extension device, and (b2) a processing location of the extended function; and
when the connection with the extension device is released, means for deleting the information on the processing location of the extended function in the stored combined information.

* * * * *